United States Patent [19]
Arnoldt

[11] Patent Number: 4,867,490
[45] Date of Patent: Sep. 19, 1989

[54] CIRCULAR DUCT CONNECTOR

[75] Inventor: Peter J. Arnoldt, Clairton, Pa.

[73] Assignee: Ductmate Industries, Inc., Monongahela, Pa.

[21] Appl. No.: 218,807

[22] Filed: Jul. 13, 1988

Related U.S. Application Data

[63] Continuation-in-part of Ser. No. 205,305, Jun. 10, 1988.

[51] Int. Cl.$^4$ .............................................. F16L 23/00
[52] U.S. Cl. ..................................... 285/367; 285/424
[58] Field of Search ................ 285/367, 331, 424, 410

[56] References Cited

U.S. PATENT DOCUMENTS

| | | | |
|---|---|---|---|
| 2,747,897 | 5/1956 | Leighton | 285/410 |
| 2,761,707 | 9/1956 | Herman | 285/367 |
| 2,804,559 | 8/1957 | Brewer | 285/410 X |
| 2,862,731 | 12/1958 | Hedden et al. | 285/367 X |
| 2,880,017 | 3/1959 | Anderson et al. | 285/424 X |
| 3,630,552 | 12/1971 | Byron | 285/367 X |
| 4,120,519 | 10/1973 | Budger | 285/410 X |
| 4,516,797 | 5/1985 | Meinig | 285/424 X |
| 4,566,724 | 1/1986 | Arnoldt | 285/424 X |
| 4,679,832 | 7/1987 | Meinig | 285/424 X |

Primary Examiner—Peter R. Brown
Attorney, Agent, or Firm—Stanley J. Price, Jr.

[57] ABSTRACT

A pair of frame members are secured to the ends of pair of adjacent generally circular ducts. Each frame member has a generally circular configuration and has an inner vertical wall, an outer vertical wall. The outer vertical wall is connected to a sloped rigidifying portion which extends outwardly from the inner vertical wall. Both the inner and outer vertical walls have horizontally extending flanges which are in abutting relation and their end portions are clampingly engaged. The frame members have a circumferential dimension less than the circumferential dimension of the duct member so that a gap is formed in the circular frame member. The frame members are positioned on the duct end portions by inserting the frame member flange portions inside the duct end portions with the top surface of the frame member upper flange abutting the underside of the duct. Fasteners secure the duct end portion to the flange members and are applied to the flange member and duct end portion to urge the frame member flange portion against the undersurface of the circular duct.

15 Claims, 2 Drawing Sheets

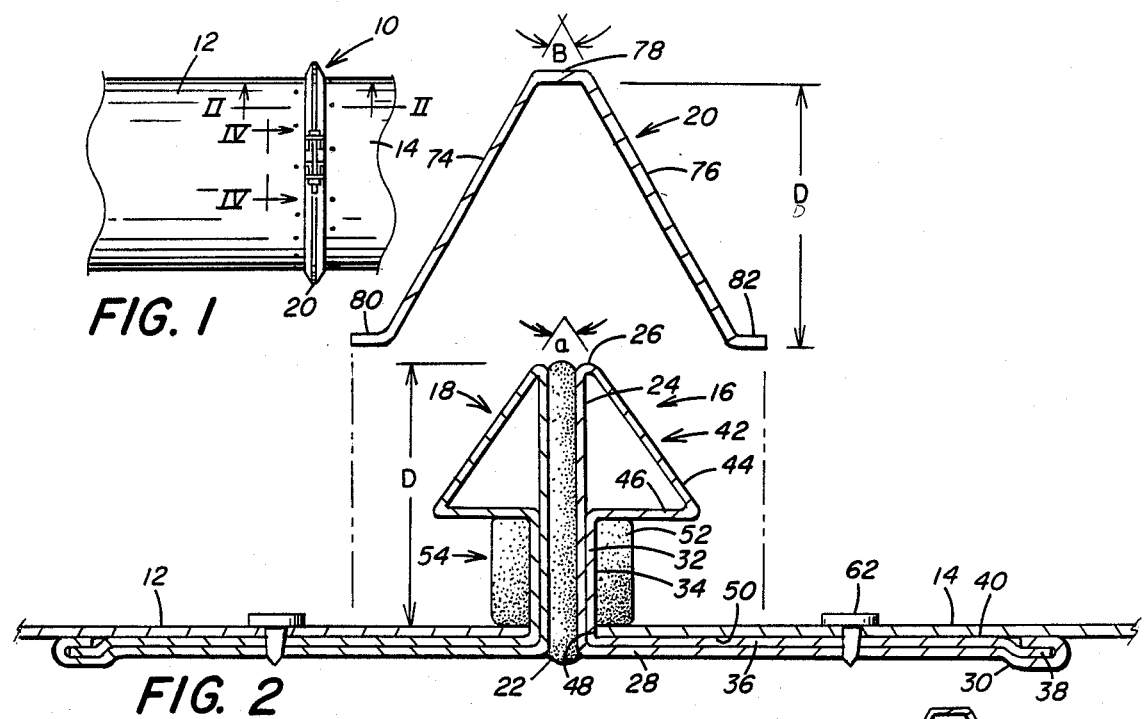
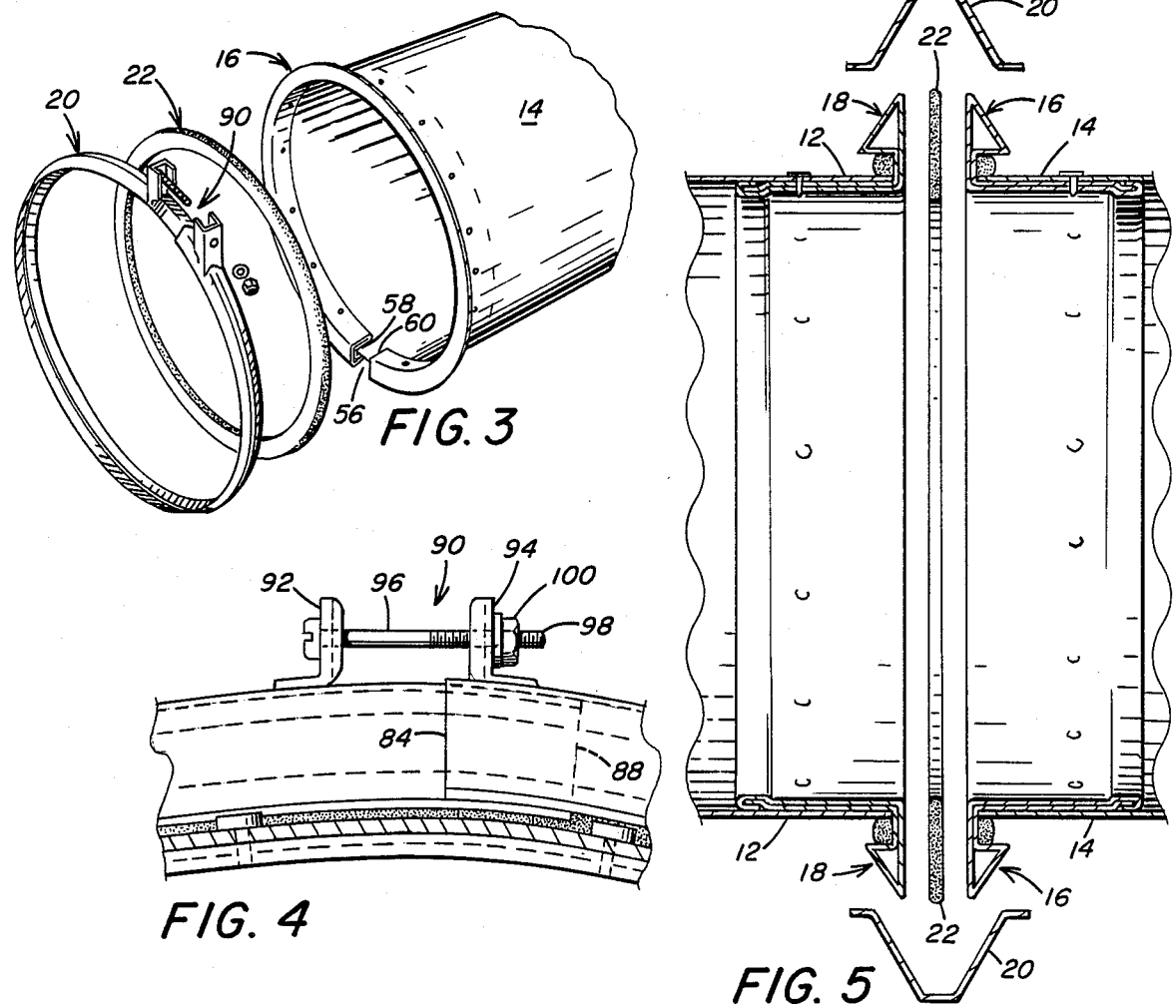

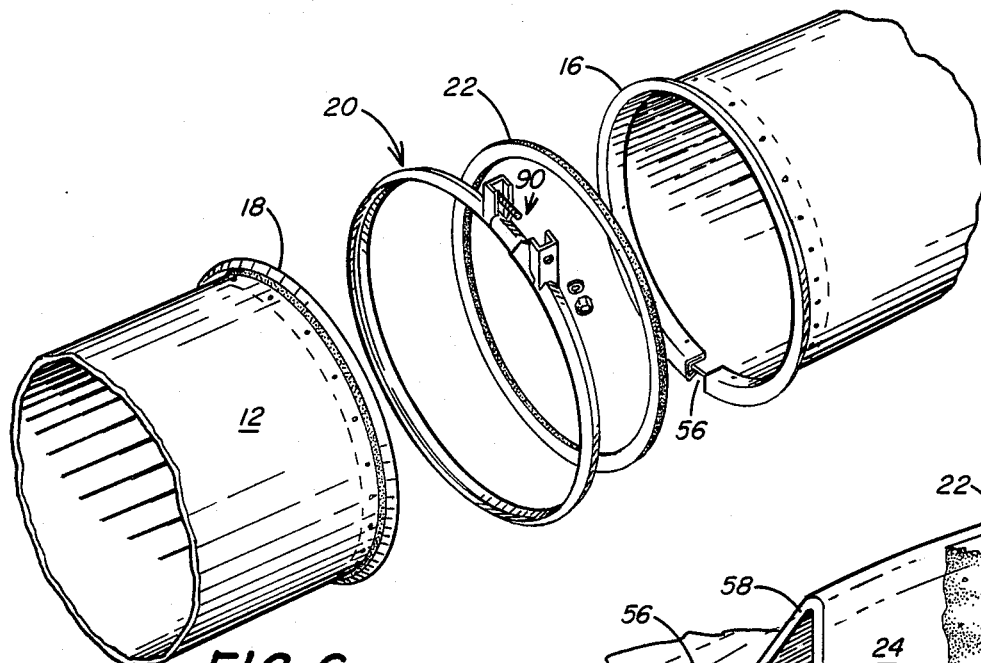
FIG. 6
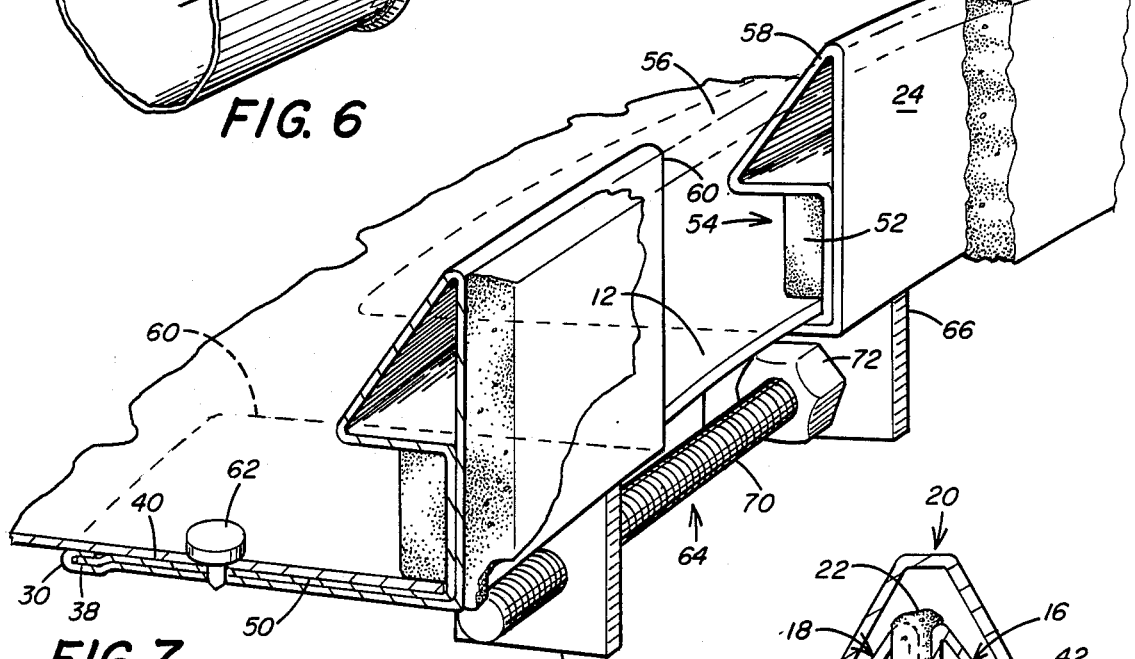
FIG. 7
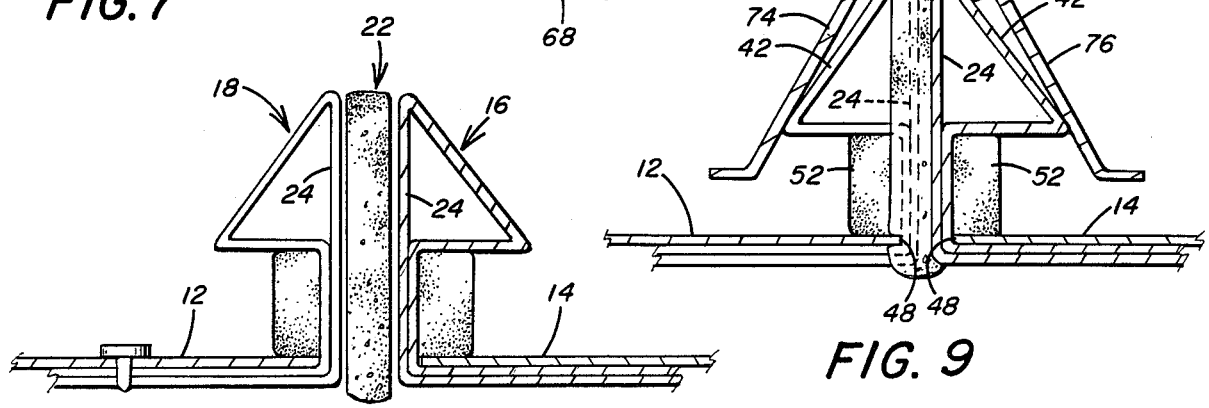
FIG. 8
FIG. 9

CIRCULAR DUCT CONNECTOR

CROSS REFERENCE TO COPENDING APPLICATION

This application is a continuation-in-part of Ser. No. 205,305 filed June 10, 1988, entitled "Duct Connector For A Circular Duct".

BACKGROUND OF THE INVENTION

1. Field of the Invention

This invention relates to a method and apparatus for connecting the ends of a pair of duct sections, and more particularly, to a duct joint frame assembly for connecting the ends of circular ducts that includes a pair of circular frame members each secured to an end portion of a circular duct and positioned to provide an airtight seal between the ends of the circular ducts as the frame members are urged together and into contact with a gasket positioned between the frame members.

2. Description of the Prior Art

It is well known to connect the ends of adjacent rectangular heating and air-conditioning ducts by a joint assembly secured to the ends of the adjacent duct members.

U.S. Pat. No. 3,415,543 discloses a hollow coupling frame for connecting a pair of rectangular duct sections. The frame includes a pair of reversely folded legs on one side thereof which define oppositely disposed channels for receipt of the sections to be joined. The legs end in angularly related laterally disposed locking lips, which extend back toward the legs to engage and lock the sections within the channels.

U.S. Pat. No. 3,630,549 discloses a duct joint connector for rectangular ducts which includes a rectangular inner frame positioned between adjacent rectangular ducts so that the duct ends abut the frame. The rectangular ducts are secured to the frame by means of external cleats. The corners of the rectangular frame are enclosed by end caps, and mastic may be pumped into the frame to seal air gaps between the ducts and the frame.

U.S. Pat. No. 4,046,409 discloses an arrangement for joining rectangular ventilation ducts. A first and second member are connected with a first duct end and a second duct end, respectively. The second member is provided with an upright stiffening leg and a horizontal leg terminated by a hook-shaped member, which can be snapped over a raised edge of the first member. The first member comprises a horizontal lip which is received by the second member.

U.S. Pat. No. 4,410,206 discloses a flange connection for rectangular air-conditioning ducts. The flange connection includes eight pieces of open-sided box girder, four of which are slipped onto and fixed to each of two rectangular ducts to form frames thereon. The two frames are then bolted together. Angle pieces are inserted into the frames at the corners and bolted to the frames to produce the desired sealing force between the frames.

U.S. Pat. No. 4,508,376 discloses a flange type duct joint assembly that includes a pair of frame members secured to the ends of adjacent rectangular ducts. The frame members have flange portions secured to each other by angular corner pieces having rearwardly curved or displaced flange portions operable to facilitate an air-tight seal between the ends of the duct sections and the frame members.

U.S. Pat. No. 4,509,778 discloses a duct joint assembly for sealingly connecting the ends of a pair of rectangular sheet metal duct sections that includes clamps for both connecting adjacent corner pieces which are part of the joint assembly and exerting sealing forces upon the corner pieces.

Assemblies for use in connecting the ends of rectangular ducts are also disclosed in the U.S. Pat. Nos. 4,542,923 and 4,558,892. The duct assemblies disclosed in these patents each include a plurality of individual frame members secured to the ends of adjacent rectangular ducts. Angular corner pieces are inserted into the ends of adjacent frame members, and the adjacent frame members on opposing duct ends are secured together by means of a clamp.

U.S. Pat. No. 4,566,724 discloses a duct joint frame for connecting rectangular duct sections that includes a plurality of flange members positioned oppositely of one another on the ends of the pair of generally rectangular ducts. Each flange member includes a stop arranged to engage a plurality of protuberances on the inner surface of the duct adjacent the duct end portion to prevent retraction of the duct end portion from the flange member. Angular corner pieces extend into the ends of the flange members to connect adjacent flange members and form a frame around the respective duct end portions.

Assemblies for connecting the ends of rectangular duct sections are also disclosed in West German Patent Nos. 2,434,160 and 2,758,295. The assemblies disclosed in these patents each include a plurality of frame members which are slipped onto the ends of the opposing duct sections, and corner pieces which are inserted into the adjacent frame members on each duct. The corner pieces are bolted together to connect the adjacent duct sections.

Although the above listed patents each disclose apparatus for connecting generally rectangular duct sections, it is also known to provide apparatus for connecting the ends of generally circular duct sections.

U.S. Pat. No. 3,512,805 discloses a flexible strip for connecting the ends of generally circular ducts. The flexible strip includes a pair of longitudinal grooves adapted to receive the ends of the circular ducts therein. Protuberances on the outside surfaces of the circular ducts engage the longitudinal grooves to prevent retraction of the circular ducts from the strip after assembly.

U.S. Pat. No. 3,791,681 discloses a device for establishing a sealing connection between the ends of tubular members. The ends of the tubular members are bent outwardly, and a sealing member is positioned between the outwardly bent ends of the adjacent tubular members. A connecting strip having a substantially U-shaped cross section is forced over the outwardly bent ends of the tubular members to clamp the tubular member ends against the sealing member.

U.S. Pat. No. 4,418,948 discloses an elastic coupling for joining two pipes or tubes carrying a pressurized fluid. The coupling includes a plurality of elastic ring segments each having an annular cross section and a clamping collar. The pipes or tubes to be connected each include an outwardly extending rim or flange around the circumference of the edge of the pipe. The pipe flanges are arranged to receive the elastic ring segments. After the elastic ring segments are placed in surrounding relationship with the pipe flanges, the clamping collar is clamped down into contact with the ring segments causing the cross section of the ring segments to contract. As the ring segments contract, the pipe flanges are moved towards one another to compress a seal disposed intermediate the two flanges.

U.S. Pat. No. 4,516,797 discloses a flanged ring for connecting sheet metal tube sections. Each flanged ring includes a securing flange which protrudes radially outwardly from the tube section, an arm projecting from the inner end of the securing flange and a ring land bent obliquely outward from the arm toward the securing flange. The outer diameter of the ring land is selected such that when it is driven into the end of the tube, it is prestressed and thus produces a joint between the flanged ring and the tube. To connect a pair of sheet metal tube sections, a pair of flanged rings are secured to the ends of adjacent circular ducts, and the securing flanges of the adjacent flanged rings are fixed firmly to one another by means of a screw connection, clamp or the like. A German publication identified as "Metu System 61" illustrates a flange ring for connecting the ends of circular metal duct and is similar to the disclosure of U.S. Pat. No. 4,516,797. There is also a Canadian publication by Titan Steel Corporation which illustrates a similar product.

While it has been suggested by the prior art devices to connect a pair of adjacent rectangular duct sections or circular duct sections by means of a pair of frame members or the like, there is a need for an improved duct connector for connecting the ends of a pair of adjacent circular ducts in which the adjacent frame members are sealingly connected to the duct end portions and the vertical walls of adjacent frame members are urged together and into contact with a gasket member positioned between the adjacent frame members to provide an airtight seal between the connected duct sections.

SUMMARY OF THE INVENTION

In accordance with the present invention, there is provided a duct joint frame assembly for connecting the ends of generally circular ducts. The frame assembly includes a pair of circular frame members arranged to be secured to an end portion of a circular duct. Each frame member has an inner vertical wall with a top edge portion and an angularly extending bottom flange. A rigidifying means extends outwardly from the inner vertical wall adjacent the top edge portion. The circular frame member further includes an outer vertical wall that extends downwardly from the rigidifying means and has an angularly extending top flange with an upper surface. The top flange upper surface is arranged to be positioned in abutting relation with the inner surface of a circular duct end portion. A means is provided to urge the frame member outwardly against the circular duct inner surface and the frame member top and bottom flanges are arranged to be secured to the end portion of the circular duct.

Further in accordance with the present invention, there is provided a duct joint frame assembly for connecting the ends of generally circular ducts that include a pair of the above circular frame members connected to end portions of a circular duct. The inner vertical walls of the frame members are positioned adjacent to each other with a circular gasket member positioned therebetween. A circular clamp member having a generally V-shaped configuration is positioned in overlying relation with the rigidifying portions of the frame members and the clamping member is urged into abutting relation therewith to compress the gasket member between the circular frame members and provide a seal therebetween. The clamping member has open end portions which are in overlapping relation when positioned on the circular frame members. A clamping means is connected to the clamp member and is arranged to reduce the circumferential dimension of the clamp member and thus urge the circular frame members against the gasket member.

The invention also includes fabricating the circular frame members with a circumferential dimension less than the circumferential dimension of the circular duct on which it is positioned so that there are free end portions of the circular frame member positioned in spaced relation to each other. The frame member is urged against the circular duct inner surface by the fastening means as the frame member is fastened to the circular duct.

Additionally, in accordance with the present invention, there is provided a method for connecting the end portions of generally circular ducts by positioning circular frame members on the end portions of a pair of adjacent ducts. The duct frame members or duct joint frames have a circumferential dimension less than the circumferential dimension of the circular duct and have sloped rigidifying portions. The duct joint frames have horizontally extending flange members which are positioned in abutting relation with the inner surface of the circular duct and the circular frame members are secured to the end portion of the circular duct in a manner to urge the circular frame member outwardly against the circular duct inner surface to sealingly connect the duct end portion to the respective circular frame member. The duct joint frames are positioned in face to face relation with a circular gasket member therebetween. The adjacent sloped outer wall portions form an included angle of the sum of the slope angles of each of the circular frame members. A circular clamp member is positioned around the circular frame members with the gasket therebetween. The circular clamp member has a generally inverted V-shaped with the walls of the clamp member having an angle less than the included angle of both frames. The clamp is tightened to urge the walls of the clamp angularly against the sloped outer walls of the duct joint frame to secure the duct joint frame members and the duct end portions to each other and sealingly compress the circular gasket therebetween.

Accordingly, the principal object of the present invention is to connect a pair of adjacent circular ducts by means of a circular duct frame assembly that includes a pair of frame members each secured to a pair of adjacent circular duct end portions. The duct joint frame assembly includes a gasket positioned between the adjacent circular frame members and the pair of frame members are urged into contact with the gasket by a circular clamp member to provide a sealed connection between adjacent circular ducts.

Another object of this invention is to provide a circular frame member having a circumferential dimension less than the circumferential dimension of the circular duct on which the frame member is positioned so that the circular frame member is urged against the surface of the circular duct and the circular duct is thus urged against the circular frame member to provide a sealed connection between the frame member and the end of the circular duct.

A further object of the present invention is to provide a method and apparatus for connecting a duct joint frame member to the end of a generally circular duct in which the duct joint frame member has sufficient rigidity to rigidly secure the end of the circular duct thereto and provide a sealed connection therebetween.

These and other objects of the present invention will be completely disclosed and described in the following specification, the accompanying drawings and the appended claims.

BRIEF DESCRIPTION OF THE DRAWINGS

FIG. 1 is a fragmentary view in elevation of a pair of duct sections connected by a joint frame assembly.

FIG. 2 is an enlarged view in section taken along the lines II—II in FIG. 1 illustrating a pair of duct joint frames connected to the end portions of a pair of adjacent ducts and the circular clamp positioned above the pair of frame members.

FIG. 3 is an exploded isometric view of a frame member including one frame member secured to the end of a duct, a gasket that is positioned between a pair of frame members and a circular clamp to sealingly connect the adjacent frame members to each other.

FIG. 4 is a view in partial section taken along the line IV—IV illustrating the overlapped end portions of the clamp ring and the clamp ring tightening assembly.

FIG. 5 is an enlarged, exploded sectional view of a pair of frame members secured to adjacent circular ducts, illustrating a gasket positioned between adjacent frame members and a clamp ring surrounding the adjacent frame members.

FIG. 6 is an enlarged, exploded isometric view of a pair of circular duct end portions having frame members secured thereto and tensioned on the duct end portions by the space in between the ends of the circular frame member and the rigid fasteners extending through the frame member and the circular duct.

FIG. 7 is a fragmentary perspective view of the spaced end portions of a frame connected to the end of a duct by fastening means and an expansion device for expanding the frame member and urging the end portions away from each other.

FIG. 8 is a view in section similar to FIG. 2 with the frame members spaced and the gasket in an expanded, non-sealing condition.

FIG. 9 is a view in section similar to FIG. 8 taken at a location between the ends of one of the frame members and illustrating the exposed edge of the duct end portion sealingly embedded in the circular gasket.

DESCRIPTION OF THE PREFERRED EMBODIMENTS

Referring to the drawings and particularly FIGS. 1 and 2, there is illustrated a duct joint frame assembly generally designated by the numeral 10 for connecting the ends of circular ducts 12 and 14. Duct joint frame assembly 10 includes a pair of circular frame members generally designated by the numerals 16 and 18 and a circular clamp generally designated by the numeral 20. The end portions of the duct 12 and 14 are secured to each other by a pair of frame members 16 and 18 connected to the respective duct end portions 12 and 14. The frame members 16 and 18 have a circular gasket 22 positioned therebetween and the circular clamp 20, as illustrated in FIG. 2, clamping secures the frame members 16 and 18 to each other which in turns connects the duct end portions 12 and 14 to each other. As will be later discussed, the configuration of the frame members 16 and 18 and the gasket 22 provide a sealed connection between the duct end portions 12 and 14.

The frame members 16 and 18 illustrated in the drawings have substantially the same configuration and are rolled from a flat piece of thin gauge metal by a roll former. The frame members have a profile which is a sectional configuration as illustrated in FIGS. 2, 5, 7, 8 and 9.

Referring to FIG. 2, which is a sectional view taken along the line II—II in FIG. 1, there is illustrated a pair of frame members 16 and 18 secured to a pair of adjacent circular ducts 12 and 14. The construction and configuration of frame member 16 and the manner in which it is connected to the circular duct 14 will be described in detail. It should be understood that the construction of the frame member 18 and its connection to the circular duct 12 is identical.

The frame member 16 includes an inner vertical wall 24 which has a top edge portion 26 and a horizontal flange portion 28. The flange portion 28 extends angularly from the inner vertical wall 24 and terminates in a downturned rebent end portion 30 that is bent downwardly as illustrated in FIG. 2. The frame member 16 also has an outer vertical wall 32 with an outer surface 34 and a horizontally extending flange 36. The flange 36 extends angularly from outer vertical wall and has a down turned end portion 38 which extends into the downturned rebent portion 30 of the horizontal bottom flange 28. The horizontal bottom flange 28 and horizontal top flange 36 are in abutting relation and the end 38 of top flange 36 is clampingly engaged in the downturned rebent portion 30. As illustrated, the top horizontal flange 36 has a top surface 40 which a substantially planar surface as viewed in section in FIG. 2. It should be understood that FIG. 2 is a view in section of a cylindrical device and the surface 40 is planar in FIG. 2, however, it is substantially flat and extends circumferentially beneath the duct end portion 14.

The frame member 16 has a rigidifying portion generally designated by the numeral 42 with an outwardly sloped or inclined leg 44 connected at one end to the inner vertical wall 24 at the top portion 26. The opposite end of the inclined portion 44 is connected to an inturned wall 46 which joins the vertical outer wall 32 at its upper edge portion. The rigidifying means 42 has a generally triangular configuration with the leg 44 having a preselected slope.

In FIG. 2, the slope of legs 44 are projected by dashdot lines from both frames 16 and 14 which in the compressed state form an included angle A. The duct end portion 14 has a front edge 48 and an under surface 50. The under surface 50 of duct 14 abuts the upper surface 40 of the outer vertical wall horizontal flange 36. With this arrangement, there is a substantial portion of the frame top flange surface 40 and duct end portion inner surface 50, which are in abutting sealing relation with each other. Further, as later discussed, the frame member horizontal flanges 28 are urged upwardly, as viewed in FIG. 2, and outwardly against the duct end portion. A mastic 52 is positioned in a pocket generally designated by the numeral 54. The pocket 54 is provided to receive a portion of the spiral overlap present in a spirally wound circular duct. The mastic 52 provides a seal between the duct edge 48 and the outer wall surface 34 around the circumference of the circular duct except at the gap 56. As later discussed the circular gasket 22 provides a seal in that area.

As illustrated in FIG. 3, the frame member 16 has a gap 56, therein, which forms free end portions 58 and 60. The frame members are fabricated with a circumferential dimension less than the circumferential dimension of the duct 14 or 16 so that when the frame member 16 is secured to the end portion of either the duct 14 or duct 16, the gap 56 is present between the end portions 58 and 60. With this arrangement, the frame members 16 and 18 can be urged outwardly against the inner surface 50 of the duct 14 to thus clampingly and sealingly engage the frame member 16 with the duct member 14.

The duct member 14 is secured to the frame member 16 by means of fasteners 62 extending through the duct wall 14 and through the two horizontal flanges 28 and 36. The fasteners may be screws, rivets, spot welds or other means to fixedly secure the end of the duct 14 to the frame 16. The manner in which the fasteners 62 are applied to the duct and the frame member provides a means for clampingly engaging the frame member horizontal flanges to the underside of the duct and thus urge the frame member outwardly toward the inner surface 50 of duct 14.

As illustrated in FIG. 7, an expanding means for the frame may be provided by means of an expander generally designated by the numeral 64. Depending members 66 and 68 are secured to the lower surface of the frame bottom horizontal flange 28 as by welding and the like on opposite sides of the frame edge portions 58 and 60. Suitable openings are provided in the depending members 66 and 68 to receive the ends of a bolt 70. Nuts 72 (only one of which is shown in FIG. 7) are provided and abut the surfaces of the depending members 66 and 68. By moving the nuts 72 longitudinally on the bolt 70, the end portions 58 and 60 of the frame are moved away from each other to increase the gap 56 therebetween and urge the horizontally extending flanges 40 and 28 of the frame 16 against the inner surface 50 of the circular duct 14. Because of the cylindrical configuration of the duct 14, any expansion or increase in the circumferential dimension of the frame 16 increase the force of the frame horizontal flanges against the underside of the duct. The circumference of the duct 14 is fixed and thus provides a rigid surface against which the frame member flanges can be urged to sealingly and rigidly connect the frame member 16 to the ends of the duct 14.

As illustrated in FIGS. 8 and 9, the duct joint frame has a pair of end portions 58 and 60 with a gap 56 therebetween. The end portion 48 of the duct 14 is embedded in the mastic 52 positioned in the pocket 54 on opposite sides of the gap 56 and the mastic 52 provides a seal therebetween. The circular gasket 22 extends along the face of the frame vertical inner wall 24 to provide a seal between the adjacent frames 16 and 18. FIG. 7 illustrates the gap 56 with the duct end portion 14 positioned in the mastic 52 and the circular gasket 22 is broken away to illustrate the gap. FIGS. 8 and 9 are views in section at the gap 56 with the frame member 18 shown in full lines and the opposite frame member 16 shown in section. It is preferred that the frames 16 and 18 be arranged on the duct end portions 12 and 14 so that the gap portions 56 are circumferentially spaced from each other as is illustrated in FIG. 8. FIG. 8 is a view with the gasket 22 in a relaxed state and not clamped between the circular frame members 16 and 18. FIG. 9 is a view similar to FIG. 8 along the same section line, illustrating the frame members 16 and 18 clamped to each other by the clamp 20 with the gasket 22 compressed therebetween.

As the portion of the gasket 22 between the end portions 58 and 60 of the frame member is compressed by the clamping engagement, a portion of the gasket 22 will extend into the gap so that the edge portion 48 of the duct 12 is embedded in the gasket 22 to thus provide a seal for the edge of the duct 12 along the gap 56. It should be understood, however, that additional mastic or the like can be positioned in the gap 56 to provide an added seal for the edge of the duct in the gap portion 56 of each of the frame members 16 and 18.

In order to sealingly connect the adjacent frame members 14 and 16 to each other, a clamp, such as clamp 20 illustrated in FIGS. 2, 3, 5, 6, 8 and 9, is utilized. The clamp 20 has a generally circular configuration and is preferably fabricated from a thin walled metallic material. The clamp includes a first leg 74 and a second leg 76 with a generally horizontal upper portion 78 and a pair of end flanges 80 and 82. The legs 54 and 56 are angularly positioned relative to each other and have an included angle B.

The height of the clamp 20 from the underside of the portion 78 to the underside of flange 82, designated the letter D is preferably the same dimension as the distance from the top 26 of the frame members to the upper surface of the duct as illustrated in FIG. 2.

The clamp 18 is split to permit it to be positioned around the pair of adjacent frame members and has edge portions 84 and 88. The circumferential dimension of the clamping member 20 is such that the end portions 84 and 88 overlap to facilitate the tightening of the clamp member 20 by the clamp ring tightening assembly generally designated by the numeral 90.

The clamp ring tightening assembly 90 includes a pair of generally L-shaped brackets 92 and 94 with bracket 92 being secured to one end of the clamp 20 and the other bracket 94 secured to the other free end of clamp 20. The brackets have openings through the upstanding leg portions for receiving a bolt 96 which has a threaded end portion 98. A nut 100 is threadedly secured on the bolt 96 and tightening of the nut 100 reduces the circumference of the clamp 20 to force the clamp 20 downwardly on the sloped portions 42 of the frame members 16 and 18. As previously described, the clamp 20 has an included angle B between the legs 74 and 76. The pair of frame members 16 and 18 have sloped walls 42 that are angularly spaced from the vertical walls 24 by an included angle A. The included angle A for the frames 16 and 18 is greater than the angle B for the legs 74 and 76 of the frame member 20. Conversely, the included angle B of clamp 20 is less than the included angle A of frame members 16 and 18. As the clamp 20 is tightened around the frame members 16 and 18, as illustrated in FIG. 9, the legs 74 and 76 of clamp 20 abut the portions of the sloped walls 42 of frame members 16 and 18 to thus urge the frame members 16 and 18 toward each other to compress the gasket 22 therebetween. This clamping causes a pinching effect which results in the adjacent frame members 16 and 18 being urged towards each other so that the walls 24 of the respective frame members compress the gasket 22 in the area adjacent the walls 24. It is this compressing action that seals the adjacent frame members 16 and 18 in gasket 22 to permit air from escaping between the adjacent frame member vertical walls 24.

As will be apparent from FIGS. 8 and 9, when the walls 24 of frame members 16 and 18 are urged towards each other to compress the gasket 22, the portion of the gasket 22 in the frame gap 56 is not compressed and extends beyond the vertical walls of the frame member into abutting relationship with the edge of the conduit to the extent that the conduit edge 48 is embedded in the gasket material.

The duct end portions 12 and 14 are sealingly connected to each other by first positioning the frame members 16 and 18 on the duct end portions and embedding the duct end portions 48 in the mastic material 52. Since the frame member has a circumferential dimension less than the circumferential dimension of the circular duct, the gap 56 is present when the frame is positioned on the duct end portion. It is preferred that the fastening means 62, such as screws or rivets or spot welds, first secure the edge of the duct to the flanges of the frame members adjacent one free edge of the frame 58. With this arrangement, the continued fastening of the frame member to the duct end portion by the fastening device 62 urge the frame member against the surface of the duct member and the gap portion 56 permits the frame member to closely conform to the configuration of the duct member so that the undersurface 50 of the duct is in close abutting relation with the surface 40 of the top flange 36. The gap 56 provides a means whereby the gap can be increased in securing the flange to the duct end portion. The circumferential dimension of the flanges is preferred to be such that at least a slight gap 56 remains after the flange is secured to the duct end portion.

It should be noted that a rigid connection is provided by the securing means 62 in that the securing means extends through the duct wall and through a pair of flanges 28 and 36 which extend from each duct flange 16. The rebent portion 30 of flange 28 by clamping the end portion 38 of flange 36 further rigidifies the portion of the duct joint frame that is secured to the duct end portion. Also the sloped portions 42 of the duct joint frame further rigidify the circular frame member and also provide a means for ensuring a tightly clamped relation between the frame members by the clamp 20.

According to the provisions of the Patent Statutes, I have explained the principal, preferred construction and mode of operation of my invention and have illustrated and described what I now consider to represent its best embodiments. However, it should be understood that, within the scope of the appended claims, the invention may be practiced otherwise than as specifically illustrated and described herein.

I claim:

1. A duct joint frame for connecting the end portions of generally circular ducts comprising,
    a circular frame member arranged to be secured to an end portion of a circular duct, said circular duct having an inner surface and a circular edge portion, said circular frame member having a circumferential dimension less than the circumferential dimension of the inner surface of said circular duct end portion,
    said frame member including;
    an inner vertical wall with a top edge portion and an angularly extending bottom flange, a rigidifying means extending outwardly from said inner vertical wall adjacent said top edge portion,
    an outer vertical wall extending downwardly from said rigidifying means and having an angularly extending top flange with an upper surface, said outer vertical wall angularly extending top flange abutting said inner vertical wall angularly extending bottom flange,
    said top flange upper surface arranged to be positioned in abutting relation with the inner surface of a circular duct end portion,
    means to urge said frame member outwardly against said circular duct inner surface,
    means to form a gap in said frame member and expose a portion of said circular duct end portion when said circular duct end portion is positioned on said circular frame member,
    said frame member inner vertical wall includes a planar inner surface arranged to sealingly receive the face of a circular gasket member,
    said exposed edge portion of said circular duct in said gap arranged to sealingly abut said face portion of said gasket and form a seal between said circular frame member and said end portion of said circular duct, and
    means to secure said frame top and bottom flanges to the end portion of a circular duct.

2. A duct joint frame as set forth in claim 1, in which, said top flange includes a down turned end portion, said bottom flange includes a rebent end portion, and said top flange having a generally arcuate and axially planar upper surface with said down turned end portion extending into said bottom flange rebent portion, said top flange rebent portion securing said top flange end portion with said top flange arcuate and axially planar upper surface engaging the mating generally arcuate and axially planar undersurface of a circular duct end portion.

3. A duct joint frame as set forth in claim 1, in which, said inner vertical wall abuts said outer vertical wall.

4. A duct joint frame as set forth in claim 1, in which, said rigidifying means includes a wall extending downwardly and sloping outwardly from said inner wall top edge portion and an inwardly extending flange connecting said sloping wall to said outer wall.

5. A duct joint frame as set forth in claim 4, in which, said rigidifying means downwardly and outwardly extending wall extends at a preselected angle from said inner wall top edge portion and forms a triangular configuration with said inner vertical wall.

6. A duct joint frame as set forth in claim 1, in which, said means to secure said frame to an end portion of said duct includes fastening means extending circumferentially around said frame and through said frame top and bottom flanges and said circular duct wall.

7. A duct joint frame as set forth in claim 1, in which, said means to secure said frame top and bottom flanges to said circular duct end portion arranged to urge said circular frame end portions away from each other to thus sealingly urge said frame top flange top surface against said circular duct inner surface.

8. A duct joint assembly for connecting the end portions of generally circular duct sections comprising,
    a pair of circular frame members, each of said frame members having end portions and arranged to be connected to an end portion of circular duct sections, said circular duct sections having an inner surface and a circular edge portion, each of said circular frame members having a circumferential dimension less than the circumferential dimension of the inner surface of said circular duct sections end portion, each said frame member having an inner vertical wall with a top edge portion and an angularly extending bottom flange, a rigidifying means extending outwardly from said inner vertical wall adjacent said top edge portion, an outer vertical wall extending downwardly from said rigidifying means and having an angularly extending top flange with an upper surface, said outer vertical wall angularly extending top flange abutting said inner vertical angularly extending bottom flange, a pair of said circular duct sections each having a frame member secured to an edge of said circular duct sections with each of said frame members forming a gap between said end portions, said circular duct having a portion of said end portions extending into said gap, gasket means positioned between a pair of adjacent frame member vertical wall portions and arranged to contact said pair of adjacent vertical wall portions, and means for urging said pair of adjacent vertical wall portions toward each other and into contact with said gasket means to provide a seal between said pair of adjacent vertical wall portions and between said portions of said circular duct end portions in said gaps formed in said circular frame members between said frame member edge portions.

9. A duct joint frame assembly as set forth in claim 8, in which, said rigidifying means on each of said frame members includes, a sloped outer wall portion connected to said inner vertical wall to stiffen said vertical wall portion, said sloped wall portion having an inturned flange extending toward said inner vertical wall.

10. A duct joint frame assembly as set forth in claim 9 which includes, clamping means having a generally circular configuration, said clamping means including a first leg and a second leg, said clamping means arranged to surround a pair of said frame members secured to a pair of adjacent circular duct end portions so that said first leg portion contacts said sloped outer wall portion of one of said frame members and said second leg end portion contacts said sloped outer wall portion of an adjacent frame member, said clamping means including means for moving said first and second leg portions in a direction toward said adjacent circular duct along said sloped outer wall portions, and said first and second leg end portions arranged to urge said pair of frame member adjacent vertical wall portions toward each other and into contact with gasket means positioned therebetween to provide a seal between said pair of adjacent vertical wall portions.

11. A duct joint frame assembly as set forth in claim 10 in which, said clamping means has a circumferential dimension greater than the circumferential dimension of said circular frame members with end portions of said clamping means in overlapping relation so that said clamping means end portions are arranged to move relative to each other during the clamping of the circular frame members.

12. A duct joint frame assembly as set forth in claim 9 in which, said rigidifying portions of said adjacent frame members provide a first preselected angle between said adjacent frame members sloped outer wall portions, said clamping means first and second leg portions being arranged in a generally inverted V-shaped configuration with said first leg angularly spaced from said second leg by a preselected angle, and said first preselected angle is greater than said second angle.

13. A method for connecting a duct joint frame to the end portion of a generally circular duct comprising, positioning a generally circular frame member having a vertical wall portion and horizontally extending flange portion on the edge of a circular duct with the flange portion positioned within the circular duct, said generally circular frame member having a circumferential dimension less than the circumferential dimension of said duct member so that a gap is formed in said circular frame member, securing said frame member flange portion to said duct end portion by rigid fastener means extending through said duct end portion and through said frame member flange portion, said fastener means first secured to said duct member and circular frame member at a location adjacent the gap in said frame member, and thereafter sequentially securing the duct member to the frame member flange portion by fastener means at locations progressively spaced at greater distances from said gap to thereby urge said frame member flange portion against the inner surface of said circular duct.

14. A method for connecting the end of generally circular duct sections comprising, positioning a pair of generally circular frame members each having a vertical wall portion and a substantially extending flange portion on the edge of a pair of circular duct sections with the flange portions positioned within the respective circular duct sections, each of said generally circular frame members having a circumferential dimension less than the circumferential dimension of said duct member so that a gap is formed in each of said circular frame members, securing each of said frame member flange portions to said respective duct end portion with a portion of said duct end portion extending into said gap formed in said respective circular frame member, positioning said frame members so that said vertical wall portions face each other, positioning a circular gasket between said frame member vertical wall portions and across said gaps formed in each of said frame members, and connecting said frame members to each other with said gasket therebetween and sealing said portion of said duct end portions in said gap with said gasket.

15. A method for connecting the ends of generally circular duct sections as set forth in claim 14 which includes, urging said pair of adjacent vertical wall portions toward each other and into contact with said circular gasket to provide a seal between said pair of adjacent vertical wall portions and distorting said gasket to move into sealing relation with said duct end portions in each of said frame member gaps.

* * * * *